United States Patent [19]

Moss et al.

[11] Patent Number: 4,475,482

[45] Date of Patent: Oct. 9, 1984

[54] SOOTBLOWING OPTIMIZATION

[75] Inventors: William H. Moss, Concord Township, Lake County; Lawrence Popiel, Sheffield Lake; Thomas J. Scheib, Chesterland, all of Ohio

[73] Assignee: The Babcock & Wilcox Company, New Orleans, La.

[21] Appl. No.: 573,078

[22] Filed: Jan. 23, 1984

Related U.S. Application Data

[63] Continuation-in-part of Ser. No. 405,840, Aug. 6, 1982, abandoned.

[51] Int. Cl.³ ............................................ F22B 37/48
[52] U.S. Cl. ................................ 122/379; 15/316 A; 122/392; 165/95
[58] Field of Search .................... 122/379, 390, 392; 15/316 R, 316 A; 165/95

[56] References Cited

U.S. PATENT DOCUMENTS

| | | | |
|---|---|---|---|
| 2,948,013 | 8/1960 | Bearer, Jr. | 122/392 X |
| 3,396,706 | 8/1968 | Rayburn | 122/390 X |
| 3,680,531 | 8/1972 | Holdt | 122/379 |
| 3,785,351 | 1/1974 | Hall | 122/379 X |
| 3,831,561 | 8/1974 | Yamamoto et al. | 122/379 |
| 4,085,438 | 4/1978 | Butler | 122/392 X |

Primary Examiner—Edward G. Favors
Attorney, Agent, or Firm—Vytas R. Matas; Robert J. Edwards

[57] ABSTRACT

A method for predicting the optimum cycle time to schedule sootblowing using on-line process measurements. The optimum cycle times dynamically adjust to changing conditions resulting from boiler operation, fuel changes, or seasonal changes. The optimum cycle time is calculated four times per second for each heat trap of a boiler (10). The optimum conditions are based on economic criteria which account for heat trap fouling, rate of fouling of other heat traps (12, 13, 14, 16, and 18) within the boiler, and on-line boiler incremental steam cost.

3 Claims, 8 Drawing Figures

FIG. 1
CROSS SECTIONAL VIEW OF BOILER

FIG. 2 — SHORT CYCLE TIME

FIG. 3 — LONG CYCLE TIME

FIG. 4 — MODEL OF PENALTY COST RATE AT ANYTIME $\theta_b$

FIG. 5 — MODEL PREDICTION OF $\theta_{opt}$ AT ANYTIME $\theta_b$

SOOTBLOWING OPTIMIZATION

This is a continuation-in-part of application Ser. No. 06/450,840, filed Aug. 6, 1982, now abandoned.

FIELD AND BACKGROUND OF THE INVENTION

The present invention relates, in general, to fossil or other organic fuel boilers and, in particular, to a new and useful method of optimizing the scheduled timing of sootblowing in such boilers.

The combustion of fossil for the production of steam or power generates a residue broadly known as ash. All but a few fuels have solid residues, and in some instances, the quantity is considerable (see Table I).

For continuous operation, removal of ash is essential. In suspension firing the ash particles are carried out of the boiler furnace by the gas stream and form deposits on the tubes in the gas passes (fouling). Under some circumstances, the deposits may lead to corrosion of these surfaces.

Some means must be provided to remove ash from the boiler surface since ash in its various forms may seriously interfere with operation or even cause shutdown. Furnace wall and convection-pass surfaces can be cleaned of ash and slag while in operation by the use of sootblowers using steam or air as a blowing medium. The sootblowing equipment directs air or product steam through retractable nozzles aimed at the areas where deposits accumulate.

Figure 1:
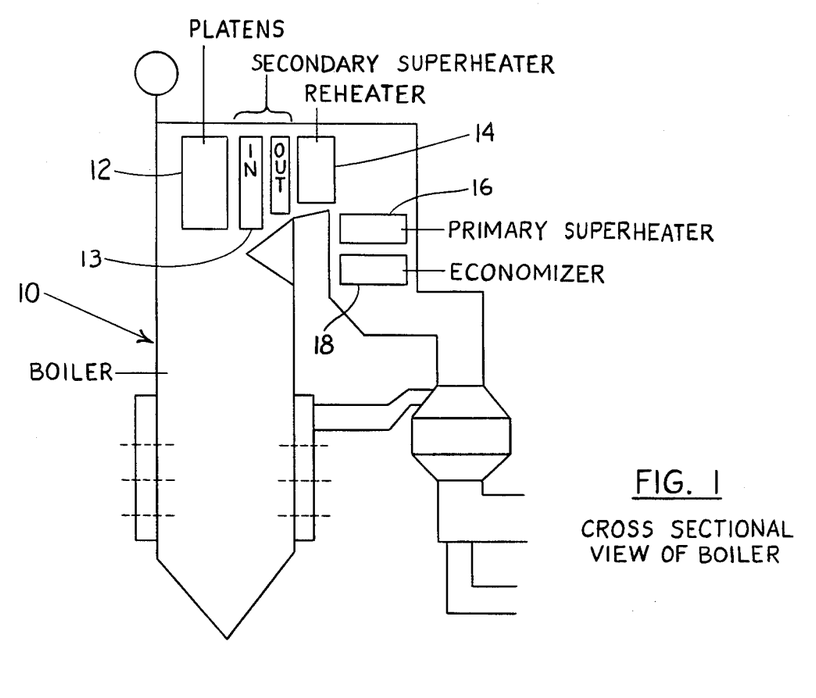
FIG. 1 is a schematic representation of a boiler for which optimum cycle time is to be determined for sootblowing.

The convection pass surfaces in the boiler, sometimes referred to as heat traps, are divided into distinct sections in the boiler (see FIG. 1). Each heat trap normally has its own dedicated set of sootblowing equipment. Usually, only one set of sootblowers is operated at any time, since the sootblowing operation consumes product steam and at the same time reduces the heat transfer rate of the heat trap being cleaned.

Scheduling and sequencing of sootblowing is usually implemented with timers. The timing schedule is developed during initial operation and startup of the boiler. In addition to timers, critical operating parameters, such as gas side differential pressure, will interrupt the timing schedule when emergency plugging or fouling conditions are detected.

TABLE I
COMMERCIAL FUELS FOR STEAM PRODUCTION

| Fuels Containing Ash | Fuels Containing Little or No Ash |
|---|---|
| All coals | Natural gas |
| Fuel oil - "Bunker C" | Manufactured gas |
| Refinery Sludge | Coke-oven gas (clean) |
| Tank residues | Refinery gas |
| Refinery coke | Distillates |
| Most tars | |
| Wood and wood products | |
| Other vegetable product | |
| Waste-heat gases (most) | |
| Blast-Furnace gas | |
| Cement-kiln gas | |

The sequencing and scheduling of the sootblowing operation can be automated by using controls. See U.S. Pat. No. 4,085,438 to Butler Apr. 18, 1978, for example. The scheduling is usually set by boiler cleaning experts who observe boiler operating conditions and review fuel analyses and previous laboratory tests of fuel fouling. The sootblower schedule control settings may be accurate for the given operating conditions which were observed, but the combustion process is highly variable. There are constant and seasonal changes in load demand and gradual long term changes in burner efficiency and heat exchange surface cleanliness after sootblowing. Fuel properties can also vary for fuels such as bark, refuse, blast furnace gas, residue oils, waste sludge, or blends of coals. As a result, sootblowing scheduling based solely on several days of operating cycles may not result in the most economical, long-term operation of the boiler.

Present practice for sootblowing scheduling is based on the use of timers. The timing schedule is developed during initial operation and start-up. No one timing schedule can be economically optimum, for there are constant and seasonal changes in burner efficiency and heat exchange surface cleanliness after sootblowing.

A boiler diagnostic package which can be used for sootblowing optimization has been proposed by T. C. Heil et al in an article entitled "Boiler Heat Transfer Model for Operator Diagnostic Information" given at the ASME/IEEE Power Gen. Conference in October 1981 at St. Louis, Mo. The method depends upon estimates of gas side temperatures from coupled energy balances, and the implementation requires extensive recursive computations to solve a series of heat trap equations. This method is used to estimate method is used to estimate heat transfer fouling factors. These intermediate results are then used as input to a boiler performance model based on steady state design conditions to estimate cost savings resulting from sootblower initiation. There is no economic optimization, however, and the method does not account for dynamic changes in incremental steam cost (i.e. the cost to produce an additional unit of steam).

SUMMARY OF THE INVENTION

The present invention is drawn to a method for predicting the optimum economic cycle time to schedule sootblowing which uses on-line process measurements. The optimum cycle times dynamically adjust to changing conditions resulting from boiler operation, fuel changes, or seasonal changes. The optimum conditions are based on economic criteria which account for heat trap fouling, rate of fouling, rate of fouling of other heat traps within the boiler, and on line incremental steam cost.

This sootblowing optimization invention has significant advantages over conventional sootblowing automation and optimization packages in that:

(a) Optimum cycle time is based on economic criteria, not inferred from heat transfer efficiency.
(b) Optimum cycle time is determined instantaneously in real time. The optimum cycle time adapts to varying operating and economic conditions.
(c) Factors such as sootblowing effectiveness, fouling on adjacent heat traps, incremental steam cost, and loading are taken into account in the dynamic calculation of optimum cycle time.
(d) The optimization only requires measurements which are readily available, e.g., no gas side furnace temperatures are necessary.
(e) The calculations are simple and easy to understand. There are no recursive calculations or system of interacting equations to solve.
(f) The optimization does not depend on design factors or initial warranty performance data.

Accordingly, an object of the present invention is to provide a method of optimizing cycle time ($\theta_{opt}$) to schedule sootblowing during the operation of a boiler having an input of fluid with a particular specific heat ($c_p$) to generate steam at a particular cost per unit of heat in the boiler comprising: sensing the input and output temperatures of fluid to and from a boiler to obtain a difference ($\Delta t$) of input and output temperatures, sensing a flow rate (m) of the fluid in the boiler during its operation, determining an incremental cost of steam ($\Phi$), with the time for actual sootblowing ($\theta_c$) being known to determine the cost of steam for sootblowing (S), calculating the heat flux (q) of the boiler during its operation according to the equation $q = mc_p\Delta t$, calculating two scaling parameters (K and P) according to the equations $K = q_0(m_{\theta b}/m_0)$ and $P = [K\theta_b/(q_0 - q_{\theta b})] - \theta_b$ and using values for T, K, S to calculate the optimum cycle time according to the relationship:

$$\phi = \left[ P\ln\left[\frac{P + \theta_{opt}}{P}\right] - \frac{P[\theta_{opt} + \theta_c]}{\theta_{opt} + P} - \frac{S}{Kk\Phi} + \theta_c \right]$$

For an understanding of the principles of the invention, reference is made to the following description of a typical embodiment thereof as illustrated in the accompanying drawings.

DESCRIPTION OF THE PREFERRED EMBODIMENT

Referring to the drawings, in particular, a method for optimizing cycle time for sootblowing in a boiler generally designated 10 is provided. The boiler 10 includes a plurality of heat traps or zones which include, for example, platens 12, secondary superheater 13 with input and output portions, reheater 14, primary superheater 16, and economizer 18.

The symbols used here have the following meanings:

$Y(\theta_b)$ = Penalty cost rate at any time $\theta_b$ ($/hr);

$m_o$ = Flowrate of fluid in boiler heat trap at start of new sootblowing cycle (lbs/hr);

$m_{\theta b}$ = Flowrate of fluid in boiler heat trap at time $\theta_b$ (lbs-steam/hr);

$\theta_t$ = Total time for one complete sootblowing cycle (hrs);

$\theta_b$ = Time since start of new sootblowing cycle (hrs);

$C_p$ = Specific heat of fluid in boiler (BTU/lb-°F.);

$\theta_c$ = Actual time per sootblowing cycle for operation of sootblowers (hrs);

S = Estimated steam cost for operation of sootblowers for period of time equal to $\theta_c$ ($);

$\Phi$ = Incremental steam cost ($/lb-steam);

$l_i$ = Boiler lead (lb steam/hr);

$S_{li}$ = Steam cost at boiler load $l_i$ ($/hr);

$\Delta t$ = Difference in input and output temperatures of fluid in boiler heat trap for which $\theta_{opt}$ is determined (°F.);

$q_o$ = Heat flux in boiler heat trap at start of new sootblowing cycle (BTU/hr);

$q_{\theta b}$ = Heat flux in boiler trap at time $\theta_b$ (BTU/hr);

K = Gain factor to adjust model for changes in boiler load (BTU/hr);

P = Model parameter which produces the best fit of model for $Y(\theta_b)$ to observed operating data (hrs);

k = Conversion factor (lb steam/BTU);

H = Total time for given period of interest (hrs);

C = Total cost penalty for operating time $\theta_b$ ($);

$C_c$ = Total cost penalty per sootblowing cycle ($);

N = Number of sootblowing cycles over time H (hrs);

$C_H$ = Total cost penalty for time H ($); and $\theta_{opt}$ = Optimum economic cycle time (hrs).

Choosing an optimum cycle time to obtain maximum heat transfer rate will also give the optimum economic cycle time ($\theta_{opt}$) for constant operating conditions. However, if boiler load ($l_i$) varies, the steam cost ($S_{li}$) and incremental steam cost ($\Phi$) will also vary because the efficiency of steam generators varies with load. Also, if the fuel cost changes, the steam cost and incremental steam cost will change also. As a consequence, the optimum economic cycle time for sootblowing ($\theta_{opt}$) may be different from the optimum cycle time to maximize heat transfer.

One approach to determining the optimum economic cycle time ($\theta_{opt}$) is to consider that sootblowing requires an incremental increase in the steam production. Scaling of the boiler heat tubes results in a cost penalty (C) by decreasing the heat transfer rate and thereby increasing the incremental steam cost O. When the tubes are cleaned, an additional cost penalty (S) is incurred as a result of using process steam for cleaning. Typical sootblowing cycles are shown in FIGS. 2 and 3 for an individual heat trap.

Figure 2:
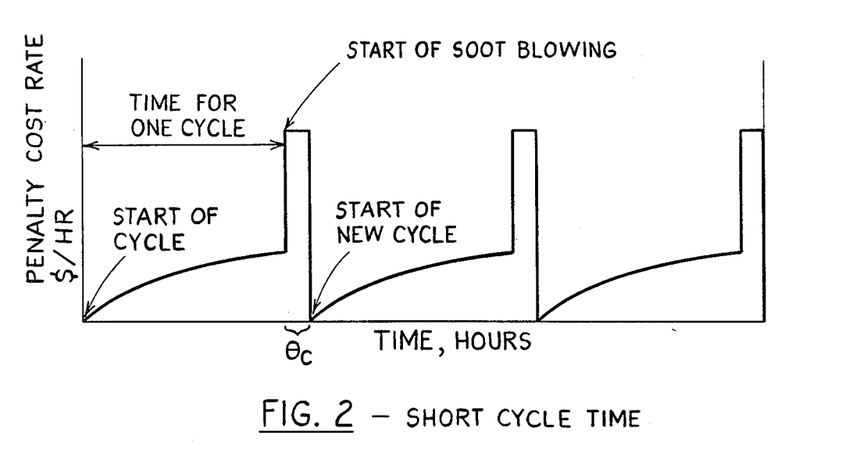
FIG. 2 is a graph showing a short cycle time for sootblowing.

In FIG. 2 the cycle time shown is relatively short. The penalty cost rate ($Y\theta_b$) increases with time until sootblowing occurs, after which the tubes are clean and the cost penalty rate ($Y\theta_b$) at the start of a new cycle is zero. The cost penalty (S) associated with actual sootblowing is much higher since the cost penalty (S) is associated with consumption of product steam rather than the cost penalty (C) associated with decrease in efficiency. The combined area under the curve for each cycle represents the total cost penalty per sootblowing cycle ($C_c$).

Figure 3:
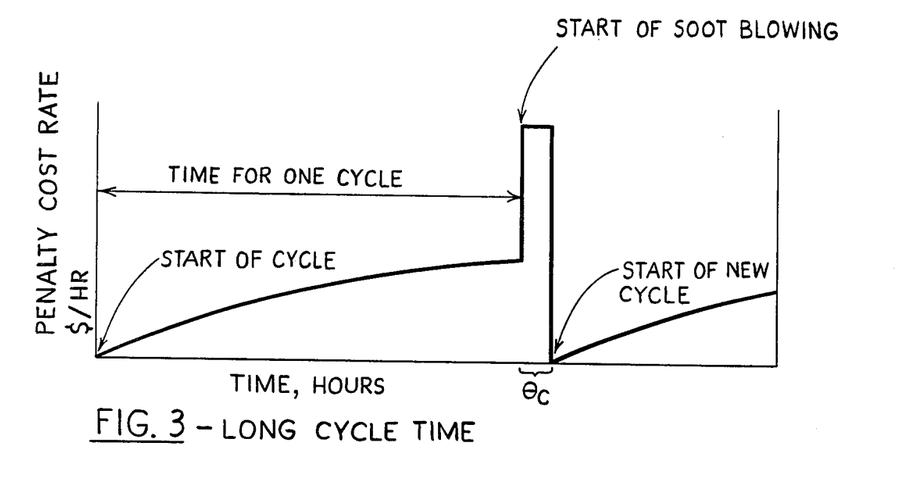
FIG. 3 is a graph showing a long cycle time for sootblowing.

In FIG. 3 the cycle time shown is longer. The cost penalty associated only with sootblowing (S) would be less than that shown in FIG. 2 since the number of cycles for a given period of time is less. However, the cost penalty (C) associated with lost efficiency due to increased scale buildup is greater. Therefore, the area under the curve shown in FIG. 3, which represents the total cost penalty for scaling and sootblowing for a given time period ($C_c$), is greater than the corresponding area shown in FIG. 2. Consequently, there must exist some optimum economic cycle time ($\theta_{opt}$) which minimizes the area under the curve and the corresponding total cost penalty per sootblowing cycle ($C_c$).

Figure 4:
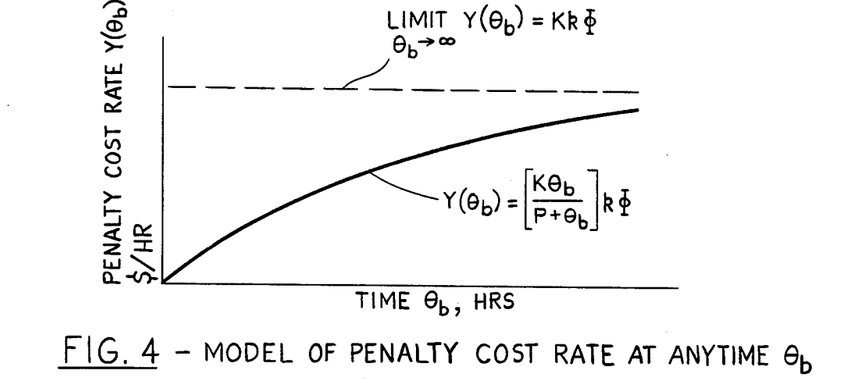
FIG. 4 is a graph of the model describing the fouling of the heat transfer surfaces.

If C represents the total cost penalty for operating time $\theta_b$, then a single parameter model for representing the penalty cost rate curve $Y(\theta_b)$ at any given instant $\theta_b$, shown graphically in FIG. 4, is:

$$Y(\theta_b) = \frac{dC}{d\theta_b} = \left[\frac{K\theta_b}{P + \theta_b}\right] k\Phi \tag{10}$$

The total penalty cost during an operational time $\theta_b(c)$ can then be determined by integrating equation (10) as follows:

$$\int_0^c dC = Kk\Phi \int_0^{\theta_b} \frac{\theta_b}{P + \theta_b} d\theta_b \tag{11}$$

and:

$$C = Kk\Phi \left[\theta_b + P\ln\left[\frac{P}{P + \theta_b}\right]\right] \tag{12}$$

Equation (12) can be used as a basis for finding the cycle time ($\theta_{opt}$) which will result in the minimum penalty cost during a given period.

Each sootblowing cycle consists of an operating time of $\theta_b$. If the actual time per cycle for operation of sootblowers is $\theta_c$, the total time in hours for one complete cycle given by:

$$\theta_t = \theta_b + \theta_c \tag{13}$$

and if the total time for a given period is H hours, then the number of cycles in H hours is:

$$N = \frac{H}{\theta_b + \theta_c} \tag{14}$$

Furthermore, if S is the steam cost for operation of sootblowers for period of time $\theta_c$, then S can be expressed as:

$$S = \Phi \theta_c l_i \tag{15}$$

where:

$$\Phi = \left(\frac{Sl_2 - Sl_1}{l_2 - l_1}\right) \tag{15}$$

then the total cost penalty per sootblowing cycle ($C_c$) is equal to:

$$C_c = C + S \tag{17}$$

and:

$$C_H = C_c \times N \tag{18}$$

Substituting the expressions for C from equation (12) and N from equation (14) into equation (18) yields:

$$C_H = \left[Kk\Phi\left(\theta_b + P\ln\left(\frac{P}{P + \theta_b}\right)\right) + S\right] * \left[\frac{H}{\theta_b + \theta_c}\right] \tag{19}$$

Under ordinary conditions, the only variable in equation (19) is $\theta_b$. However, the incremental steam cost $\Phi$, and therefore, the sootblowing cost S may vary from cycle to cycle. Also, the gain factor K and model parameter P may vary as function of boiler load $l_i$.

However, if $\Phi$, S, P, K are assumed constant, the the optimum cycle time ($\theta_{opt}$) can be obtained by taking the derivative of equation (19) with respect to $\theta_b$, setting it equal to zero and solving for $\theta_b\theta_{opt}$;

$$\frac{dC_H}{d\theta_b} = \tag{20}$$

$$\left(P\ln\left[\frac{P + \theta_b}{P}\right] - \frac{P(\theta_b + \theta_c)}{\theta_b + P} - \frac{S}{Kk\Phi} + \theta_c\right) * \frac{HKk\Phi}{(\theta_b + \theta_c)^2}$$

and setting:

$$\theta_b = \theta_{opt} \text{ for } \frac{dC_H}{d\theta_b} = \phi = g(\theta_{opt}) \tag{21}$$

then:

$$g(\theta_{opt}) = \phi = \tag{22}$$

$$\left[P\ln\left[\frac{P + \theta_{opt}}{P}\right] - \frac{P(\theta_{opt} + \theta_c)}{\theta_{opt} + P} - \frac{S}{Kk\Phi} + \theta_c\right]$$

A simple closed form solution of equation (22) such as, $\theta_{opt} = (P, K, S, \Phi)$ is not possible. However, the form $g(\theta_{opt}) = \Phi$ can be solved using conventional trial and error techniques such as Regula-Falsi or Newton-Raphson. In the implementation of the optimum sootblowing method with digital instrumentation, a PID controller may be used to drive the value of equation (20) to zero.

The optimum economic cycle time $\theta_{opt}$ can, thus, be determined by assuming $\Phi$, S, P, and K are constant. However, if these parameters change, the optimum economic cycle ($\theta_{opt}$) will vary. For example, with large swings in boiler load the rate of scale build-up on heat exchanger surfaces will be significantly affected and $\theta_{opt}$ will vary from cycle to cycle for each boiler heat trap. Instantaneous values of $\theta_{opt}$, which take into account changes in incremental steam cost $\Phi$ and boiler load $l_i$, can be calculated if the parameters P and K can be continuously updated.

The model for the penalty cost rate $Y(\theta_b)$ at any time $\theta_b$, as shown in equation (10), required a gain factor (K) and a model parameter (P). The values for K and P at time $\theta_b$ may be inferred from on-line measurements of heat flux (q) in the boiler heat trap as follows:

$$Y(\theta_b) = k(q_o - q_{\theta_b})\Phi \tag{23}$$

where:

$$q_i = m_i c_p \Delta T \tag{24}$$

If the boiler tube side fluid flow rate (m) varies, then the penalty cost rate $Y(\theta_b)$ at any time $\theta_b$ can be normalized as follows:

$$Y(\theta_b) = k(K - q_{\theta_b})\Phi \tag{25}$$

where:

$$K = q_o \frac{m_{\theta_b}}{m_o} \qquad (26)$$

Figure 5:
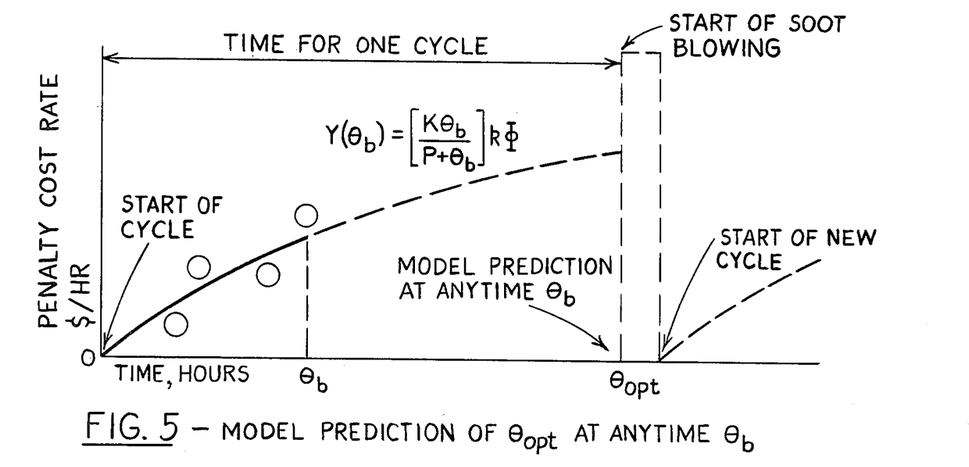
FIG. 5 is a graph showing the model prediction of $\theta_{opt}$ at anytime $\theta$.

One objective of the model for the penalty cost rate $Y(\theta_b)$ at any time $\theta_b$ is to use on-line heat flux computations at time $\theta_b$ to predict a future optimum economic cycle time $\theta_{opt}$ where $\theta_{opt} > \theta_b$. This is shown graphically in FIG. 5. Using this model, the value of P can be determined from equation (10) for each value of $\theta_b$ and $Y(\theta_b)$ as follows:

$$P + \theta_b = \left( \frac{K\theta_b}{Y(\theta_b)} \right) k\Phi$$

and:

$$P = \frac{Kk\Phi\theta_b}{Y(\theta_b)} - \theta_b \qquad (28)$$

or substituting for $Y(\theta_b)$ from EQ. 23:

$$P = \frac{K\theta_b}{(q_c - q_{\theta_b})} - \theta_b$$

By using the values of K and P from equations (26) and (29), equation (22) can be solved for the instantaneous values of $\theta_{opt}$ which take into account changes in incremental steam cost ($\Phi$) and steam load ($l_i$) by integrating the error from a null balance recursive solution technique.

The model for the penalty cost rate $Y(\theta_b)$ at any time $\theta_b$ utilizes measurements of tube side fluid temperature differences ($\Delta T$), which are readily available. No gas side furnace temperatures are necessary. In addition, optimum economic cycle time $\theta_{opt}$, is determined instantaneously and thus adapts to varying operating and economic conditions, such as incremental steam cost $\Phi$ and boiler load $l_i$.

The instantaneous optimum economic cycle time ($\theta_{opt}$) for each heat trap is determined independently of the other heat traps. However, interaction among the various heat traps is taken into account because each heat trap affects the overall efficiency and resultant incremental steam cost. Calculation of overall efficiency is biased on the losses method and is not affected by the heat trap performance calculations.

Figure 6:
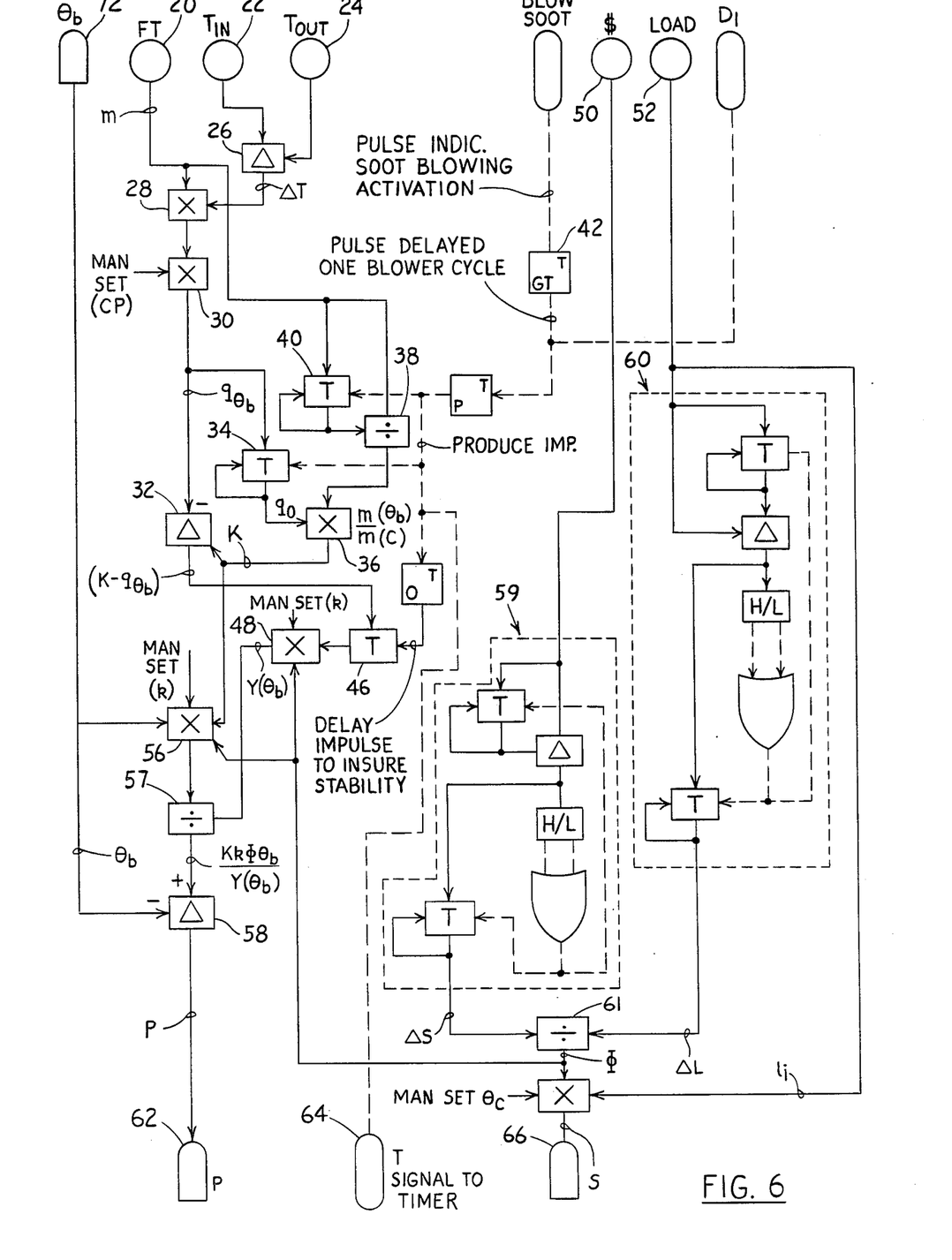
FIGS. 6, 7, and 8 are block diagrams showing exemplary logic for practicing the invention.

Referring to FIG. 6, in particular, fluid flow as well as input and output temperatures are provided by transmitters 20, 22, and 24 respectively. The driving temperature is obtained in comparator 26 with its output multiplied by a flow rate in multiplication unit 28. The output is multiplied again by a constant ($C_p$) which represents specific heat of the fluid (water) in multiplier 30. The output of multiplier 30 represent the heat flux (q) in the tubes of the boiler at various times during boiler operation. After the expiration of a cycle period, $\theta_b$, the flux value for the end of the period ($q_{\theta_b}$) is calculated and provided to a second comparator 32. The ratio of flow rate after the termination of the cycle ($M_{\theta_b}$) to flow rate at the beginning of the cycle ($M_o$) is supplied to element 36 which receives the ratio ($M_{\theta_b}/M_o$) from a dividing element 38 and a terminal 40 for storing the initial value of flow rate. A transfer terminal 34 holds the initial value for heat flux ($q_o$) (right after a sootblowing operation) which is provided to multiplying element 36. The output of element 36, which corresponds to the factor K, is compared in comparator 32 to obtain a different value. Transfer terminals 34 and 40 are operated by pulses from a gate 42 which is connected to a controller 44 that controls sootblowing initiation.

Terminal 46 receives a value from comparator 32 with that value, a constant (k) which separates a conversion factor (lb-steam/BTU), and a value from dividing element 61 representing the increment steam cost ($\Phi$) being provided to a multiplier 48. The incremental steam cost ($\Phi$) is calculated from a cost transmitter 50 and modified by a load transmitter 52 which process signals as shown in the logic circuitry generally designated 59 and 60 to generate values which are divided in elements 61 to provide a value which represents the incremental steam cost $\Phi$.

A multiplying element 56, dividing element 57, and a comparator 58 generate the scaling factor P. Terminals 62, 64, and 66 carry the values for P, the signal for the sootblower timer, and S, respectively.

Figure 7:
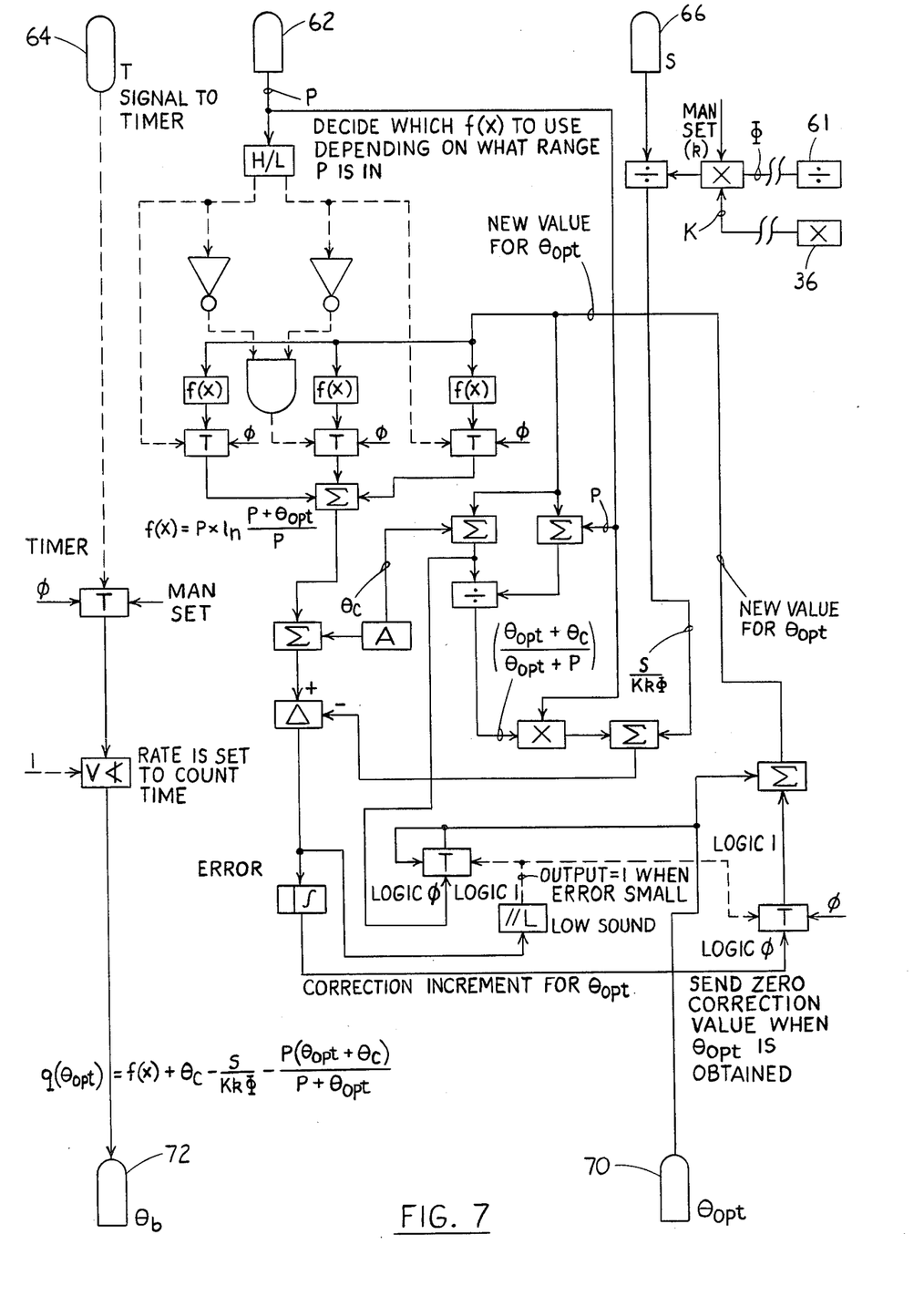
Figure 8:
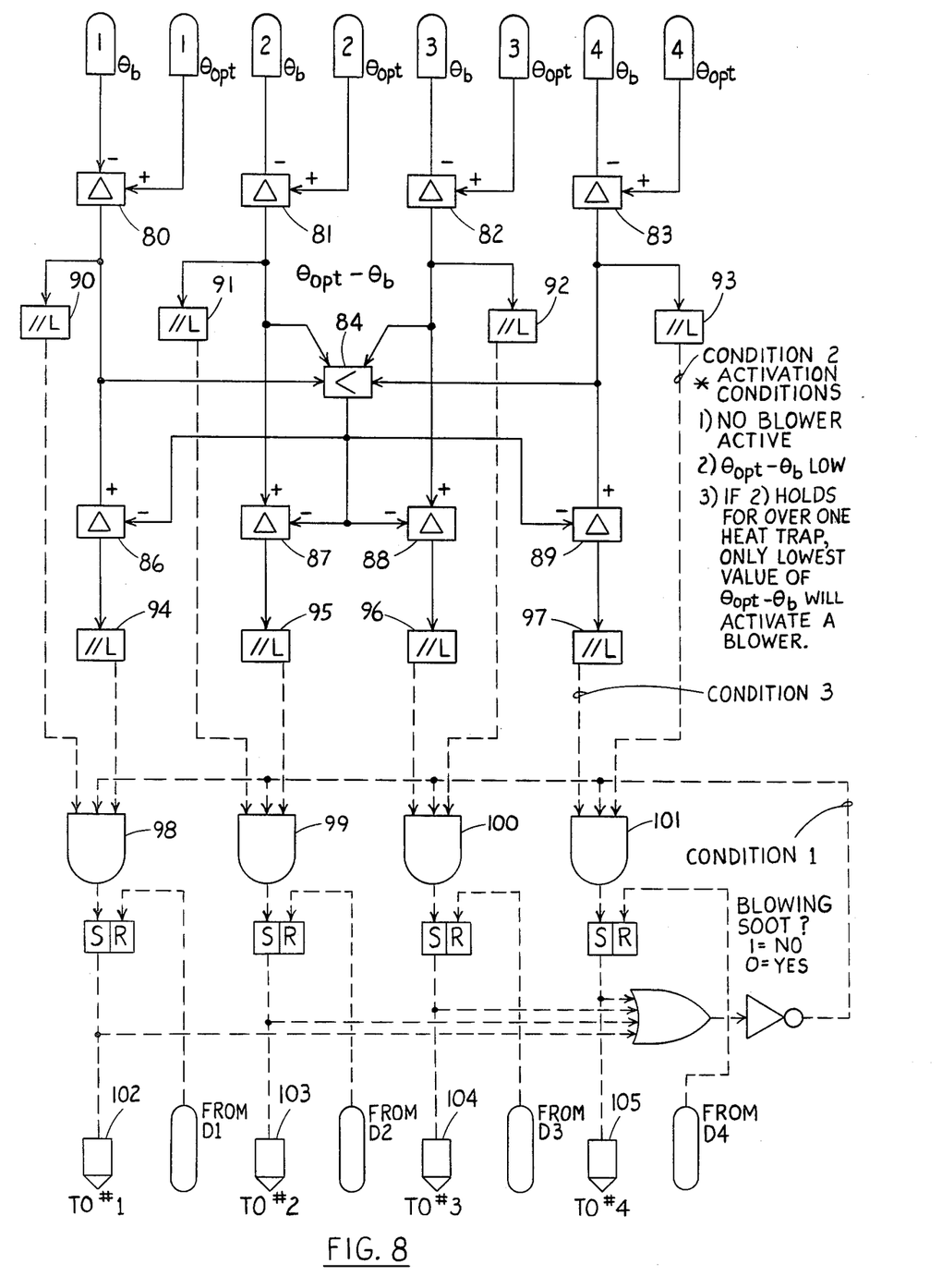

Logic configurations for the on-line predictive penalty cost model, the instantaneous optimum economic cycle time ($\theta_{opt}$) calculation, and the sootblowing sequencer are given in FIGS. 7 and 8.

As shown in FIG. 7, terminals 62, 64, and 66 supply their respective signals to additional circuitry which is utilized to generate the optimum cycle time $\theta_{opt}$ which is supplied at terminal 70. The cycle time is manually set, for example, for maximum fuel efficiency and provided at terminal 72 which value is also used in the circuitry of FIG. 6 to generate the scaling parameter P.

In the circuitry shown in FIG. 8, the set and optimum cycle values $\theta_b$ and $\theta_{opt}$ from four heat traps, numbered 1 to 4, are shown. Comparators 80 to 83 obtain a difference between the optimum and set cycle times with comparator 84 choosing the smallest difference. The conditions which must be met before the sootblower of a particular heat trap is activated are as follows:

(a) No other blower is currently active;
(b) the difference between set and optimum cycle time is sufficiently low, and
(c) if condition (b) exists for more than one heat trap, the heat trap at the lowest value is chosen.

For this purpose, comparators 86 to 89 are utilized as well as lower limit detectors 90 to 97. AND gate 98, 99, 100, and 101 compare Boolean logic signal and only the AND gate with all positive inputs is activated to operate its respective sootblowing equipment which is connected to control elements 102, 103, 104, and 105, respectively.

While a specific embodiment of the invention has been shown and described in detail to illustrate the application of the principles of the invention, it will be embodied otherwise without departing from such principles.

What is claimed is:

1. A method of optimizing cycle time ($\theta_{opt}$) to schedule sootblowing during the operation of a boiler having an input of fluid with a particular specific heat ($c_p$) to generate steam at a particular cost per unit of heat in the boiler comprising: sensing the input and output temperatures of fluid to and from a boiler to obtain a difference ($\Delta t$) of input and output temperatures, sensing a flow rate (m) of the fluid in the boiler during its operation, determining an incremental cost of steam ($\Phi$), with the time for actual sootblowing ($\theta_c$) being known to determine the cost of steam for sootblowing (S), calculating the heat flux (q) of the boiler during its operation according to the equation $q=mc_p\Delta t$, calculating two scaling parameters (K and P) according to the equation $K=q_o(m_{\theta b}/m_o)$ and $P=[K\theta_b/(q_o-q_{\theta b})]-\theta_b$ and using values for T, K, S to calculate the optimum cycle time according to the relationship:

$$\phi = \left[ P\ln\left[\frac{P + \theta_{opt}}{P}\right] - \frac{P[\theta_{opt} + \theta_c]}{\theta_{opt} + P} - \frac{S}{Kk\Phi} + \theta_c \right]$$

2. A method according to claim 1, wherein the boiler includes a plurality of heat traps each with its own input of fluid including sensing the input and output temperatures for each heat trap, sensing the flow rate through each heat trap and calculating values for P and K to obtain optimum cycle times for each heat trap, determining optimum cycle time $\theta_{opt}$ for each heat trap for optimum economic efficiency.

3. A method, according to claims 1 or 2, wherein the optimum economic cycle time is determined, and the difference between time since previous sootblowing and optimum economic cycle time is determined for each heat trap, where the heat trap having the largest negative difference is exposed to a sootblowing operation.

* * * * *